United States Patent [19]
Nakagawa et al.

[11] Patent Number: 5,618,464
[45] Date of Patent: Apr. 8, 1997

[54] NI FERRITE AND CORE MADE OF NI FERRITE FOR POWER SUPPLIES

[75] Inventors: Emi Nakagawa; Hitoshi Ueda; Akio Uchikawa; Norikazu Koyuhara, all of Tottori, Japan

[73] Assignee: Hitachi Ferrite, Ltd., Tokyo, Japan

[21] Appl. No.: 402,693

[22] Filed: Mar. 13, 1995

[30] Foreign Application Priority Data

Mar. 16, 1994 [JP] Japan .................................. 6-072497

[51] Int. Cl.$^6$ .................................................. C04B 35/30
[52] U.S. Cl. ........................................ 252/62.6; 252/62.62
[58] Field of Search ............................... 252/62.62, 62.6, 252/62.56

[56] References Cited

U.S. PATENT DOCUMENTS

| | | | |
|---|---|---|---|
| 2,933,565 | 4/1960 | Neumann | 252/62.62 |
| 3,573,208 | 3/1971 | Brockman et al. | 252/62.62 |
| 4,059,664 | 11/1977 | Nicolas et al. | 252/62.62 |
| 5,198,138 | 3/1993 | Yamamoto et al. | 252/62.62 |

FOREIGN PATENT DOCUMENTS

| | | | |
|---|---|---|---|
| 64-72924 | 3/1989 | Japan | 252/62.62 |
| 2-22130 | 1/1990 | Japan | 252/62.62 |

*Primary Examiner*—Melissa Bonner
*Attorney, Agent, or Firm*—Sughrue, Mion, Zinn, Macpeak & Seas

[57] ABSTRACT

A Ni ferrite sintered body comprising 48.0–50.0 mol % of $Fe_2O_3$, 14.0–24.0 mol % of NiO and 28.0–36.0 mol % of ZnO with 50 ppm or less of P as an impurity, the sintered body having a minimum core loss of 30 kW/m$^3$ or less at 50 kHz and 50 mT, and the segregation percentage of P in the crystal structure being 1% or less by area. The Ni ferrite sintered body preferably has an average crystal grain size of 3–30 μm, the percentage of crystal grain particles larger than two times the average crystal grain size being preferably 10% or less based on the total number of the crystal grain particles in a crystal structure.

3 Claims, 3 Drawing Sheets

01
NI FERRITE AND CORE MADE OF NI FERRITE FOR POWER SUPPLIES

BACKGROUND OF THE INVENTION

The present invention relates to a ferrite sintered body and a core made of such a ferrite sintered body for use in transformers of switching power supplies, liquid crystal display back-lights, etc.

Switching power supplies and liquid crystal display back-lights, etc., are widely used in various applications such as home electric appliances, electronic equipment usable in offices and factories, and their size, thickness and weight have been reduced recently. Transformers in switching power supplies and liquid crystal display back-lights, etc., have conventionally been made of Mn ferrite.

Since the Mn ferrite has large saturation magnetic flux density and permeability and as small a core loss as about 10 kW/m$^3$ at 50 kHz and 50 mT, it has been used for transformers in switching power supplies, liquid crystal display back-lights, etc. However, since the Mn ferrite has a relatively small resistivity of about 10 Ω·m, leak current is generated when a conductive wire is directly wound around a core made of the Mn ferrite. For this reason, when the Mn ferrite core is used for transformers for switching power supplies, etc., the core is covered by an insulating bobbin or coated with an insulating layer before wire winding, resulting in high production cost and difficulty in miniaturization.

On the other hand, since a Ni ferrite core generally has an extremely high resistivity of about 10$^6$ Ω·m, a conductive wire can directly be wound around the Ni ferrite core. However, since it shows as large a core loss as about 60 kW/m$^3$ at 50 kHz and 50 mT, the Ni ferrite core is likely to suffer from heat generation, making it unsuitable for transformers for switching power supplies, etc.

OBJECTS AND SUMMARY OF THE INVENTION

Accordingly, an object of the present invention is to provide a Ni ferrite sintered body having a high resistivity and a small core loss, which is suitable as core materials for transformers for switching power supplies, etc.

Another object of the present invention is to provide a core made of such Ni ferrite for power supplies.

In a first aspect of the present invention, there is provided a Ni ferrite sintered body comprising 48.0–50.0 mol % of Fe$_2$O$_3$, the Ni ferrite sintered body having a minimum core loss of 30 kW/m$^3$ or less at 50 kHz and 50 mT.

In a second aspect of the present invention, there is provided a Ni ferrite sintered body comprising 48.0–50.0 mol % of Fe$_2$O$_3$, the segregation percentage of P in a crystal structure of the sintered body being 1% or less by area.

In a third aspect of the present invention, there is provided a Ni ferrite sintered body comprising 48.0–50.0 mol % of Fe$_2$O$_3$, the sintered body containing 50 ppm or less, preferably 7 ppm or less, of P.

In a fourth aspect of the present invention, there is provided a Ni ferrite sintered body comprising 28.0–36.0 mol % of ZnO, the sintered body having a minimum core loss of 30 kW/m$^3$ or less at 50 kHz and 50 mT, and the minimum core loss being achieved in a temperature range of 20°–140° C.

In a fifth aspect of the present invention, there is provided a Ni ferrite sintered body comprising 48.0–50.0 mol % of Fe$_2$O$_3$, 14.0–24.0 mol % of NiO and 28.0–36.0 mol % of ZnO, the sintered body having a minimum core loss of 30 kW/m$^3$ or less at 50 kHz and 50 mT. 12 mol % or less (excluding 0 mol %) of NiO may be replaced by the same amount of CuO.

In a sixth aspect of the present invention, there is provided a Ni ferrite sintered body containing 50 ppm or less of P, the segregation percentage of P in a crystal structure of the sintered body being 1% or less by area, and the sintered body having a minimum core loss of 30 kW/m$^3$ or less at 50 kHz and 50 mT.

In a seventh aspect of the present invention, there is provided a Ni ferrite sintered body having an average crystal grain size of 3–30 μm, the number of crystal grain particles larger than two times the average crystal grain size being 10% or less based on the total number of the crystal grain particles in a crystal structure of the sintered body, and the sintered body having a minimum core loss of 30 kW/m$^3$ or less at 50 kHz and 50 mT.

In an eighth aspect of the present invention, there is provided a core for power supplies, the core being made of a Ni ferrite sintered body having a minimum core loss of 30 kW/m$^3$ or less at 50 kHz and 50 mT. dr

DETAILED DESCRIPTION OF THE PREFERRED EMBODIMENTS

Figure 1:
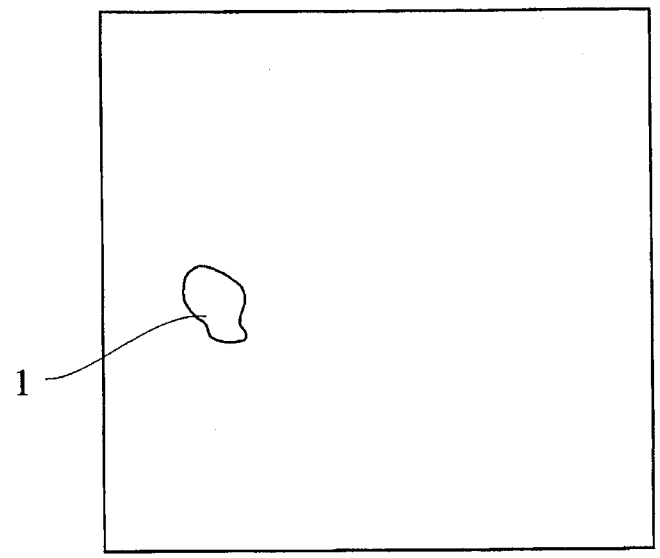
FIG. 1 is a schematic view showing a small segregation percentage of P in Sample No. 41.

Since conventional Ni ferrite sintered bodies show as large a core loss as about 60 kW/m$^3$ at 50 kHz and 50 mT, they are not suitable for transformers of switching power supplies, etc. As a result of research on Ni ferrite materials suitable for the transformers of switching power supplies, it has been found that by controlling the amount of Fe$_2$O$_3$ to 48.0–50.0 mol % in the Ni ferrite, the core loss of the Ni ferrite can be reduced to as small as 30 kW/m$^3$ or less at 50 kHz and 50 mT. With respect to phosphorus (P), the smaller the segregation percentage of P in a crystal structure of the Ni ferrite, the smaller the core loss of the Ni ferrite. It is important that the segregation percentage of P is as small as 1% or less and that the content of P in the Ni ferrite sintered body is as low as 50 ppm or less, preferably 7 ppm or less.

When the amount of ZnO is 28.0–36.0 mol %, the temperature at which the minimum core loss can be achieved is controlled within the range of 20°–140° C.

The Ni ferrite sintered body according to the present invention preferably has a composition comprising 48.0–50.0 mol % of Fe$_2$O$_3$, 14.0–24.0 mol % of NiO and 28.0–36.0 mol % of ZnO, in which 12 mol % or less (excluding 0 mol %) of NiO may be replaced by the same amount of CuO. With this composition, the Ni ferrite sintered body can be suitably used for the transformers of switching power supplies, etc., at low core loss.

The Ni ferrite sintered body according to the present invention preferably has an average crystal grain size of 3–30 μm, the number of crystal grain particles larger than two times this average crystal grain size being 10% or less based on the total number of the crystal grain particles in a crystal structure of the sintered body. This means that the crystal grain particles are preferably as uniform as possible.

[1] Composition of Ni Ferrite Sintered Body

(a) $Fe_2O_3$ $Fe_2O_3$ is a main component of the Ni ferrite sintered body of the present invention. When the amount of $Fe_2O_3$ is less than 48.0 mol %, the Ni ferrite sintered body shows a large core loss. On the other hand, when it exceeds 50.0 mol %, the Ni ferrite sintered body has a small resistivity, resulting in the reduction of insulation which is characteristic of the Ni ferrite.

The $Fe_2O_3$ powder used as a starting material inevitably contains phosphorus (P). Since P is chemically bonded to Fe in the $Fe_2O_3$, P cannot be removed during sintering. Accordingly, it is necessary to use the $Fe_2O_3$ powder in which the content of P as an impurity is as small as possible. For the purpose of the present invention, the content of P in the $Fe_2O_3$ powder should be 76 ppm or less. If P is contained in the $Fe_2O_3$ powder in an amount exceeding 76 ppm, the resultant Ni ferrite sintered body inevitably contains more than 50 ppm of P, resulting in a large segregation percentage of P in the crystal structure of the Ni ferrite sintered body.

To reduce the content of P to 50 ppm or less, preferably 7 ppm or less, the $Fe_2O_3$ powder is preferably obtained by the following methods: In the first method, a waste liquid obtained by washing iron plates with hydrochloric acid is treated to adjust its pH, thereby insolubilizing impurities. The waste liquid is then filtered to recover iron oxide ($Fe_2O_3$) powder. In the second method, the above waste liquid is pre-treated and then concentrated by heating to precipitate iron oxide ($Fe_2O_3$). After solubilizing and reprecipitating the iron oxide, it is burned to obtain iron oxide ($Fe_2O_3$) powder.

(b) NiO

When the amount of NiO is less than 14.0 mol %, the Ni ferrite sintered body shows a low resistivity, failing to provide a high insulation. On the other hand, when it exceeds 24.0 mol %, the Ni ferrite sintered body has a large core loss.

(c) ZnO

When the amount of ZnO is less than 28.0 mol %, the Ni ferrite sintered body shows a large core loss. On the other hand, when it exceeds 36.0 mol %, a temperature at which the minimum core loss is achieved is lower than room temperature, failing to provide the Ni ferrite sintered body with a small core loss in a temperature range in which the core made of the Ni ferrite sintered body is usually used. To obtain the temperature range of 20°–140° C. in which the minimum core loss is achieved, the amount of ZnO should be 28.0–36.0 mol %. The preferred amount of ZnO is 29.0–33.0 mol %.

(d) CuO 12 mol % or less (excluding 0 mol %) of NiO may be replaced by the same amount of CuO. Thus, the total amount of NiO and CuO is 14.0–24.0 mol %. when the amount of CuO exceeds 12 mol %, the Ni ferrite sintered body has a large core loss.

(e) P

As described above, P is introduced as an inevitable impurity into the Ni ferrite sintered body mainly through the $Fe_2O_3$ powder. When the amount of P exceeds 50 ppm, there is a large segregation percentage of P in the crystal structure of the Ni ferrite sintered body, whereby the Ni ferrite sintered body shows a large core loss. Accordingly, the amount of P should be controlled to 50 ppm or less. The preferred amount of P is 7 ppm or less.

(f) Other Components

The Ni ferrite sintered body of the present invention may further contain up to about 1 weight % of one or more additives selected from the group consisting of Mg, Ca, Sr, Ba, Al, Si, Ge, In, Sn, Sb, Te, Tl, Bi, Pb and transition metals.

[2] Crystal Structure Of Ni Ferrite Sintered Body

(a) Average crystal grain size

The crystal structure of the Ni ferrite sintered body according to the present invention has an average crystal grain size of 3–30 μm. When the average crystal grain size is smaller than 3 μm, the Ni ferrite sintered body has a large core loss. On the other hand, when it exceeds 30 μm, the crystal structure contains undesirably grown crystal grain particles, also resulting in large core loss. The preferred average crystal grain size is 5–20 μm.

(b) Crystal grain particle size distribution

The percentage of crystal grain particles larger than two times the average crystal grain size should be 10% or less based on the total number of the crystal grain particles in a crystal structure of the Ni ferrite sintered body. When the percentage of the more than two times crystal grain particles is more than 10%, the Ni ferrite sintered body has a large core loss. The preferred percentage of the more than two times crystal grain particles is 5% or less.

(c) Segregation percentage of P

Since a large segregation of P in the crystal structure of the Ni ferrite sintered body leads to a large core loss, the segregation percentage of P should be as small as possible. For the purpose of the present invention, the segregation percentage of P is 1% or less by area. When the segregation percentage of P is more than 1%, the Ni ferrite sintered body has a large core loss. The preferred segregation percentage of P is 0.8% or less.

The segregation percentage of P is determined on a SEM or EDX photograph (×2000). Specifically, a SEM or EDX photograph is taken at an acceleration voltage of 20 kV on a cross section of the Ni ferrite sintered body which is ground and polished and then heat-treated at a temperature of 930°–1050° C., and the distribution of P is examined in an area of 1600 μm² or more in the SEM or EDX photograph. The resultant P map is image-analyzed to determine an area in which P exists. A total of P-containing areas is divided by the total area of the SEM or EDX photograph examined to determine the segregation percentage of P.

[3] Properties Of Ni Ferrite Sintered Body (a) Core loss

The core loss of the Ni ferrite sintered body of the present invention should be 30 kW/m$^3$ or less at 50 kHz and 50 mT. If it is larger than 30 kW/m$^3$, the cores made of such Ni ferrite sintered body cannot advantageously be used for transformers of switching power supplies, liquid crystal display back-lights, etc.

(b) Temperature at which minimum core loss is achieved

The temperature at which the minimum core loss is achieved should be within the range of 20°–140° C. If this temperature is outside the range of 20°–140° C., the transformers comprising cores made of such Ni ferrite sintered body are not useful in practical applications. The temperature providing the minimum core loss is preferably within the range of 40°–140° C.

(b) Resistivity

The Ni ferrite sintered body of the present invention advantageously shows a resistivity of about 1×10$^5$ or more. With such a high resistivity, the Ni ferrite sintered body of the present invention can provide transformer cores which do not suffer from leak current even when directly wound by conductive wires. Accordingly, the cores made of the Ni ferrite sintered body of the present invention need not be covered with insulating bobbins or coatings.

[3] Production Of Ni Ferrite Sintered Body

Predetermined amounts of $Fe_2O_3$, NiO, ZnO and CuO as starting material powders are mixed and ball-milled for 7–72 hours. The resultant mixture is calcinated at a maximum temperature of 700°–1000° C. for 1–3 hours, pulverized and then granulated with a binder such as polyvinyl alcohol. After formed into a green body having a desired shape, it is sintered at 900°–1250° C. for 1–5 hours. If the sintering temperature is lower than 900° C., it is impossible to achieve the desired sintering density and crystal density. On the other hand, if the sintering temperature is higher than 1250° C., extreme crystal grain growth may take place.

The present invention is described in further detail referring to the following Examples without intention of restricting the scope of the present invention.

EXAMPLE 1

Starting material powders of $Fe_2O_3$, NiO, ZnO and CuO were weighed and mixed together with a predetermined amount of ion-exchanged water in a ball mill for 4 hours. The resultant mixture was calcinated at a maximum temperature of 850° C. for 1.5 hours in an electric furnace, cooled in the furnace, and pulverized with a 40-mesh sieve. After a predetermined amount of ion-exchanged water was added, the mixture was ball-milled for 6 hours, and the resultant slurry was dried and pulverized. After adding 1 weight % of polyvinyl alcohol as a binder, the mixture was granulated and made uniform by a 40-mesh sieve. The resultant granules were formed into a ring-shaped core having an outer diameter of 16.8 mm, an inner diameter of 8.5 mm and a height of 5.4 mm by using a dry compression mold and a die at a molding pressure of 1.5 ton/cm$^2$. The ring-shaped core was sintered at 1100° C. or 1150° C. for 1.5 hours in the air.

Each sample was measured with respect to a composition and a density, and then with respect to a core loss under the conditions of a frequency of 50 kHz and a magnetic flux density of 50 mT at a temperature of 20°–140° C. Also, the crystal structure (crystal grain particle size and composition distribution) of the sintered body was observed. Since the composition of each component may slightly change from the original one during steps, it was determined in the final sintered body. The results are shown in Table 1.

TABLE 1

| Sample | Composition (mol %)[1] | | | | Average Crystal Grain Size (μm) | Large Crystal Grain Particles (%)[2] | Core Loss[3] | | Density[4] ($\times 10^3$ kg/m$^3$) | Resistivity ($\Omega \cdot$ m) | Sintering Temp. (°C.) |
|---|---|---|---|---|---|---|---|---|---|---|---|
| | $Fe_2O_3$ | NiO | ZnO | CuO | | | (kW/m$^3$) | (°C.) | | | |
| 1 | 49.00 | 13.25 | 31.75 | 6.00 | 3.9 | 4 | 30 | 80 | 5.25 | $2 \times 10^{10}$ | 1100 |
| 2 | 49.15 | 13.10 | 31.75 | 6.00 | 4.4 | 4 | 24 | 80 | 5.22 | $1 \times 10^9$ | 1100 |
| 3 | 49.40 | 12.85 | 31.75 | 6.00 | 4.3 | 4 | 25 | 80 | 5.27 | $3 \times 10^8$ | 1100 |
| 4 | 49.60 | 12.65 | 31.75 | 6.00 | 5.5 | 5 | 19 | 80 | 5.19 | $2 \times 10^7$ | 1100 |
| 5 | 49.70 | 12.55 | 31.75 | 6.00 | 4.9 | 4 | 21 | 80 | 5.26 | $1 \times 10^7$ | 1100 |
| 6 | 50.20 | 12.05 | 31.75 | 6.00 | 1.5 | 2 | 67 | 40 | 5.13 | $8 \times 10^4$ | 1100 |
| 7 | 49.15 | 13.10 | 31.75 | 6.00 | 4.2 | 4 | 27 | 80 | 5.23 | $5 \times 10^8$ | 1150 |
| 8 | 49.40 | 12.85 | 31.75 | 6.00 | 4.1 | 4 | 27 | 80 | 5.29 | $4 \times 10^7$ | 1150 |
| 9 | 49.60 | 12.65 | 31.75 | 6.00 | 4.8 | 5 | 21 | 80 | 5.22 | $8 \times 10^6$ | 1150 |
| 10 | 49.90 | 12.35 | 31.75 | 6.00 | 4.9 | 5 | 21 | 80 | 5.24 | $3 \times 10^5$ | 1150 |
| 11 | 50.20 | 12.05 | 31.75 | 6.00 | 4.7 | 5 | 22 | 80 | 5.22 | $5 \times 10^4$ | 1150 |
| 12 | 48.00 | 17.00 | 35.00 | 0.00 | 4.0 | 5 | 29 | 80 | 5.25 | $5 \times 10^8$ | 1200 |
| 13 | 48.60 | 16.40 | 35.00 | 0.00 | 4.3 | 5 | 25 | 60 | 5.17 | $2 \times 10^7$ | 1200 |
| 14 | 49.00 | 16.00 | 35.00 | 0.00 | 4.7 | 5 | 20 | 60 | 5.12 | $1 \times 10^7$ | 1200 |
| 15 | 49.50 | 15.50 | 35.00 | 0.00 | 4.5 | 5 | 23 | 40 | 5.11 | $4 \times 10^5$ | 1200 |
| 16 | 50.00 | 15.00 | 35.00 | 0.00 | 3.9 | 4 | 30 | 40 | 5.12 | $1 \times 10^5$ | 1200 |
| 17 | 50.50 | 14.50 | 35.00 | 0.00 | 3.0 | 4 | 40 | 20 | 4.80 | $1 \times 10^4$ | 1200 |
| 18 | 48.90 | 19.10 | 32.00 | 0.00 | 4.3 | 5 | 25 | 100 | 5.29 | $1 \times 10^8$ | 1200 |
| 19 | 49.30 | 18.70 | 32.00 | 0.00 | 4.4 | 5 | 23 | 100 | 5.23 | $1 \times 10^7$ | 1200 |
| 20 | 49.80 | 18.20 | 32.00 | 0.00 | 3.9 | 4 | 29 | 100 | 5.20 | $4 \times 10^5$ | 1200 |
| 21 | 48.70 | 17.80 | 33.50 | 0.00 | 4.3 | 5 | 25 | 60 | 5.15 | $3 \times 10^7$ | 1200 |
| 22 | 49.20 | 17.30 | 33.50 | 0.00 | 4.9 | 5 | 21 | 80 | 5.15 | $1 \times 10^7$ | 1200 |
| 23 | 49.80 | 16.70 | 33.50 | 0.00 | 4.4 | 5 | 24 | 60 | 5.00 | $9 \times 10^5$ | 1200 |

TABLE 1-continued

| Sample | Composition (mol %)[1] | | | | Average Crystal Grain Size (μm) | Large Crystal Grain Particles (%)[2] | Core Loss[3] | | Density[4] (×10³ kg/m³) | Resistivity (Ω · m) | Sintering Temp. (°C.) |
|---|---|---|---|---|---|---|---|---|---|---|---|
| | Fe₂O₃ | NiO | ZnO | CuO | | | (kW/m³) | (°C.) | | | |
| 24 | 50.50 | 16.00 | 33.50 | 0.00 | 2.4 | 4 | 50 | 60 | 4.85 | 1 × 10⁴ | 1200 |
| 25 | 47.50 | 19.00 | 33.50 | 0.00 | 2.7 | 4 | 45 | 40 | 5.27 | 1 × 10⁹ | 1200 |
| 26 | 49.00 | 13.00 | 38.00 | 0.00 | 4.3 | 5 | 25 | −10 | 5.18 | 1 × 10⁷ | 1200 |
| 27 | 49.00 | 24.00 | 27.00 | 0.00 | 2.4 | 3 | 125 | 100 | 5.23 | 1 × 10⁷ | 1200 |
| 28 | 48.00 | 25.00 | 27.00 | 0.00 | 1.2 | 2 | 148 | 40 | 5.25 | 3 × 10⁶ | 1200 |
| 29 | 49.50 | 7.50 | 37.00 | 6.00 | 4.1 | 5 | 28 | −20 | 5.27 | 7 × 10⁸ | 1100 |
| 30 | 49.50 | 17.50 | 27.00 | 6.00 | 4.5 | 4 | 25 | 160 | 5.26 | 4 × 10⁸ | 1100 |

Note:
[1]Measured on the final sintered body.
[2]The percentage (%) of crystal grain particles larger than two times the average crystal grain size per the total amount of the crystal grain particles.
[3]"kW/m³" is a unit of the minimum core loss measured, and "°C." is a temperature at which the minimum core loss was achieved.
[4]The density of the sintered body (×1000 kg/m³).

As is clear from Table 1, when the amount of Fe₂O₃ was within the range of 48.0–50.0 mol %, the resultant Ni ferrite sintered body showed a minimum core loss of 30 kW/m³ or less. Similarly small minimum core loss was obtained in the Ni ferrite compositions comprising 48.0–50.0 mol % of Fe₂O₃, 14.0–24.0 mol of NiO and 28.0–36.0 mol % of ZnO, in which 12 mol % or less of NiO may be replaced by CuO.

EXAMPLE 2

Samples containing different amounts of P were produced in the same manner as in Example 1. The Fe₂O₃ powder used as a starting material contained P as follows:

| Sample | P (ppm) in Fe₂O₃ Powder |
|---|---|
| 31 | <10 |
| 32 | 10 |
| 33 | 100 |
| 34 | 120 |
| 35 | <10 |
| 36 | 10 |
| 37 | 100 |
| 38 | 120 |

The sintering temperature was 1100° C. or 1050° C. The resultant Ni ferrite sintered body was measured with respect to an average crystal grain size, a percentage of crystal grain particles larger than two times the average crystal grain size, a core loss, a sintering density and a resistivity. The measurement results of each sample are shown in Table 2.

As is clear from Table 2, when the amount of P was 7 ppm or less, the minimum core loss of the Ni ferrite sintered body was 30 kW/m³ or less.

EXAMPLE 3

Samples containing different amounts of P were produced in the same manner as in Example 1 to examine the segregation percentage of P in the crystal structure of each sintered body. The Fe₂O₃ powder used as a starting material contained P as follows:

| Sample | P (ppm) in Fe₂O₃ Powder |
|---|---|
| 39 | <10 |
| 40 | 10 |
| 41 | 70 |
| 42 | 100 |
| 43 | <10 |
| 44 | 10 |
| 45 | 70 |
| 46 | 120 |

The segregation percentage of P was measured as follows: First, each sample was cut and a cross section of each sample was polished. After heat-treatment at a temperature 50° C. lower than the sintering temperature, the composition distribution of each sample was measured on a SEM photograph (×2000) in an area of 1600 μm². A total of areas in which P existed was divided by the total area (1600 μm²) of the SEM photograph examined to determine the segregation percentage of P. The results are shown in Table 3.

TABLE 2

| Sample | Composition (mol %)[1] | | | | P (ppm) | Average Crystal Grain Size (μm) | Large Crystal Grain Particles (%)[2] | Core Loss[3] | | Density[4] (×10³ kg/m³) | Resistivity (Ω · m) | Sintering Temp. (°C.) |
|---|---|---|---|---|---|---|---|---|---|---|---|---|
| | Fe₂O₃ | NiO | ZnO | CuO | | | | (kW/m³) | (°C.) | | | |
| 31 | 49.7 | 15.0 | 29.3 | 6.0 | <7 | 5.5 | 3 | 26 | 100 | 5.26 | 7 × 10⁷ | 1100 |
| 32 | 49.7 | 15.0 | 29.3 | 6.0 | 7 | 6.3 | 4 | 19 | 140 | 5.24 | 8 × 10⁵ | 1100 |
| 33 | 49.7 | 15.0 | 29.3 | 6.0 | 66 | 10.0 | 12 | 53 | 80 | 5.16 | 2 × 10⁹ | 1100 |
| 34 | 49.7 | 15.0 | 29.3 | 6.0 | 80 | 86.0 | 23 | 49 | 100 | 5.19 | 8 × 10⁸ | 1100 |
| 35 | 49.7 | 15.0 | 29.3 | 6.0 | <7 | 5.7 | 3 | 20 | 140 | 5.23 | 2 × 10⁸ | 1050 |
| 36 | 49.7 | 15.0 | 29.3 | 6.0 | 7 | 4.3 | 3 | 25 | 120 | 5.16 | 9 × 10⁶ | 1050 |
| 37 | 49.7 | 15.0 | 29.3 | 6.0 | 66 | 5.1 | 4 | 40 | 100 | 5.05 | 3 × 10⁹ | 1050 |
| 38 | 49.7 | 15.0 | 29.3 | 6.0 | 80 | 55.0 | 17 | 46 | 100 | 5.18 | 1 × 10⁹ | 1050 |

Note: [1]-[4]The same as in Table 1.

Figure 2:
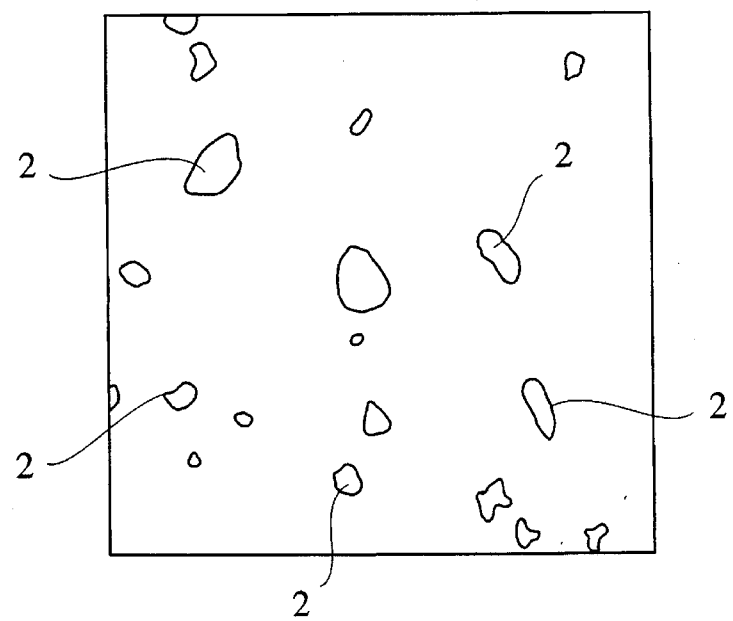
FIG. 2 is a schematic view showing a large segregation percentage of P in Sample No. 42.

With respect to Sample No. 41, a SEM photograph (×2000) showing the segregation percentage of P was taken and image-analyzed with respect to the distribution of P in the crystal structure of Sample No. 41. The segregation of P is schematically shown in FIG. 1. Sample No. 42 was also subjected to an image analysis of P on a SEM photograph (×2000), and the segregation of P is shown in FIG. 2. In Sample No. 41 shown in FIG. 1, the segregation of P was appreciated in one spot designated by "1," and its area was 0.8%. In Sample No. 42 shown in FIG. 2, the segregation of P was appreciated in many spots designated by "2," and its area was 5.4%.

which the sintering temperature was kept). Each of the resultant Ni ferrite sintered bodies was measured with respect to a core loss, an average crystal grain size and the percentage of crystal grain particles larger than two times the average crystal grain size. Their relations are shown in Table 5. When the average crystal grain size was within the range of 3–30 μm, or when the percentage of crystal grain particles larger than two times the average crystal grain size was 10% or less based on the total number of the crystal grain particles in the crystal structure of the Ni ferrite sintered body, the Ni ferrite sintered body showed a core loss of 30 kW/m$^3$ or less.

TABLE 3

| Sample | Composition (mol %)[1] | | | | P (ppm) | Average Crystal Grain Size (μm) | Large Crystal Grain Particles (%)[2] | P* (%) | Core Loss[3] (kW/m$^3$) | (°C.) | Density[4] (×10$^3$ kg/m$^3$) | Resistivity (Ω·m) | Sintering Temp. (°C.) |
|---|---|---|---|---|---|---|---|---|---|---|---|---|---|
| | Fe$_2$O$_3$ | NiO | ZnO | CuO | | | | | | | | | |
| 39 | 49.7 | 15.0 | 29.3 | 6.0 | <7 | 5.5 | 3 | 0 | 26 | 100 | 5.26 | 7 × 10$^7$ | 1100 |
| 40 | 49.7 | 15.0 | 29.3 | 6.0 | 7 | 6.3 | 4 | 0 | 19 | 140 | 5.24 | 8 × 10$^5$ | 1100 |
| 41 | 49.7 | 15.0 | 29.3 | 6.0 | 46 | 9.0 | 10 | 0.8 | 30 | 140 | 5.20 | 3 × 10$^6$ | 1100 |
| 42 | 49.7 | 15.0 | 29.3 | 6.0 | 66 | 10.0 | 12 | 5.4 | 53 | 80 | 5.16 | 2 × 10$^9$ | 1100 |
| 43 | 49.7 | 15.0 | 29.3 | 6.0 | <7 | 5.7 | 3 | 0 | 20 | 140 | 5.23 | 2 × 10$^8$ | 1050 |
| 44 | 49.7 | 15.0 | 29.3 | 6.0 | 7 | 4.3 | 3 | 0 | 25 | 120 | 5.16 | 9 × 10$^6$ | 1050 |
| 45 | 49.7 | 15.0 | 29.3 | 6.0 | 46 | 4.2 | 3 | 0 | 30 | 120 | 5.19 | 9 × 10$^7$ | 1050 |
| 46 | 49.7 | 15.0 | 29.3 | 6.0 | 80 | 55.0 | 17 | 4.8 | 46 | 100 | 5.18 | 1 × 10$^9$ | 1050 |

Note: [1]-[4]The same as in Table 1.
*: The segregation percentage of P expressed by "% by area."

EXAMPLE 4

Ni ferrite sintered bodies containing NiO which was replaced by various amounts of CuO were produced and examined in the same manner as in Example 1. The results are shown in Table 4. When the amount of CuO substituting for NiO was 12 mol % or less, the minimum core loss of the resultant Ni ferrite sintered body was as small as 30 kW/m$^3$ or less.

TABLE 4

| Sample | Composition (mol %)[1] | | | | Average Crystal Grain Size (μm) | Large Crystal Grain Particles (%)[2] | Core Loss[3] (kW/m$^3$) | (°C.) | Density[4] (×10$^3$ kg/m$^3$) | Resistivity (Ω·m) | Sintering Temp. (°C.) |
|---|---|---|---|---|---|---|---|---|---|---|---|
| | Fe$_2$O$_3$ | NiO | ZnO | CuO | | | | | | | |
| 47 | 49.5 | 19.0 | 31.5 | 0.0 | 3.8 | 4 | 29 | 90 | 5.11 | 1 × 10$^5$ | 1250 |
| 48 | 49.5 | 18.0 | 31.5 | 1.0 | 4.4 | 4 | 24 | 100 | 5.21 | 1 × 10$^5$ | 1250 |
| 49 | 49.5 | 16.0 | 31.5 | 3.0 | 4.5 | 4 | 24 | 100 | 5.22 | 3 × 10$^7$ | 1150 |
| 50 | 49.5 | 13.0 | 31.5 | 6.0 | 5.2 | 3 | 20 | 80 | 5.21 | 2 × 10$^{10}$ | 1100 |
| 51 | 49.5 | 15.0 | 29.5 | 6.0 | 4.7 | 3 | 22 | 140 | 5.25 | 2 × 10$^{10}$ | 1100 |
| 52 | 49.5 | 13.0 | 29.5 | 8.0 | 4.3 | 4 | 25 | 130 | 5.27 | 1 × 10$^9$ | 1100 |
| 53 | 49.5 | 11.0 | 29.5 | 10.0 | 5.5 | 4 | 29 | 120 | 5.27 | 5 × 10$^8$ | 1150 |
| 54 | 49.5 | 9.0 | 29.5 | 12.0 | 6.7 | 5 | 30 | 110 | 5.29 | 3 × 10$^7$ | 1150 |
| 55 | 49.5 | 8.0 | 29.5 | 13.0 | 7.8 | 5 | 40 | 100 | 5.30 | 7 × 10$^6$ | 1150 |

Note: [1]-[4]The same as in Table 1.

EXAMPLE 5

Various Ni ferrite sintered bodies were prepared in the same manner as in Example 1 except for changing the sintering temperature and the sintering time (time during

TABLE 5

| Sample | Composition (mol %)[1] | | | | Average Crystal Grain Size (μm) | Large Crystal Grain Particles (%)[2] | Core Loss[3] | | Density[4] | Resistivity | Sintering Temp. | Sintering Time |
|---|---|---|---|---|---|---|---|---|---|---|---|---|
| | $Fe_2O_3$ | NiO | ZnO | CuO | | | (kW/m³) | (°C.) | (×10³ kg/m³) | (Ω · m) | (°C.) | (hours) |
| 56 | 49.7 | 15.0 | 29.3 | 6.0 | 5.5 | 3 | 26 | 140 | 5.26 | 7 × 10⁷ | 1100 | 1.5 |
| 57 | 49.7 | 15.0 | 29.3 | 6.0 | 28.3 | 4 | 29 | 140 | 5.20 | 3 × 10⁶ | 1130 | 1.5 |
| 58 | 49.7 | 15.0 | 29.3 | 6.0 | 24.2 | 12 | 40 | 140 | 5.24 | 8 × 10⁵ | 1130 | 5 |
| 59 | 49.7 | 15.0 | 29.3 | 6.0 | 33.0 | 9 | 35 | 140 | 5.26 | 1 × 10⁵ | 1150 | 1.5 |
| 60 | 49.7 | 15.0 | 29.3 | 6.0 | 2.4 | 2 | 53 | 100 | 5.10 | 9 × 10⁸ | 1030 | 1.5 |
| 61 | 49.7 | 15.0 | 29.3 | 6.0 | 5.7 | 3 | 20 | 140 | 5.23 | 2 × 10⁸ | 1050 | 1.5 |

Note: [1]–[4]The same as in Table 1.

EXAMPLE 6

Figure 3:
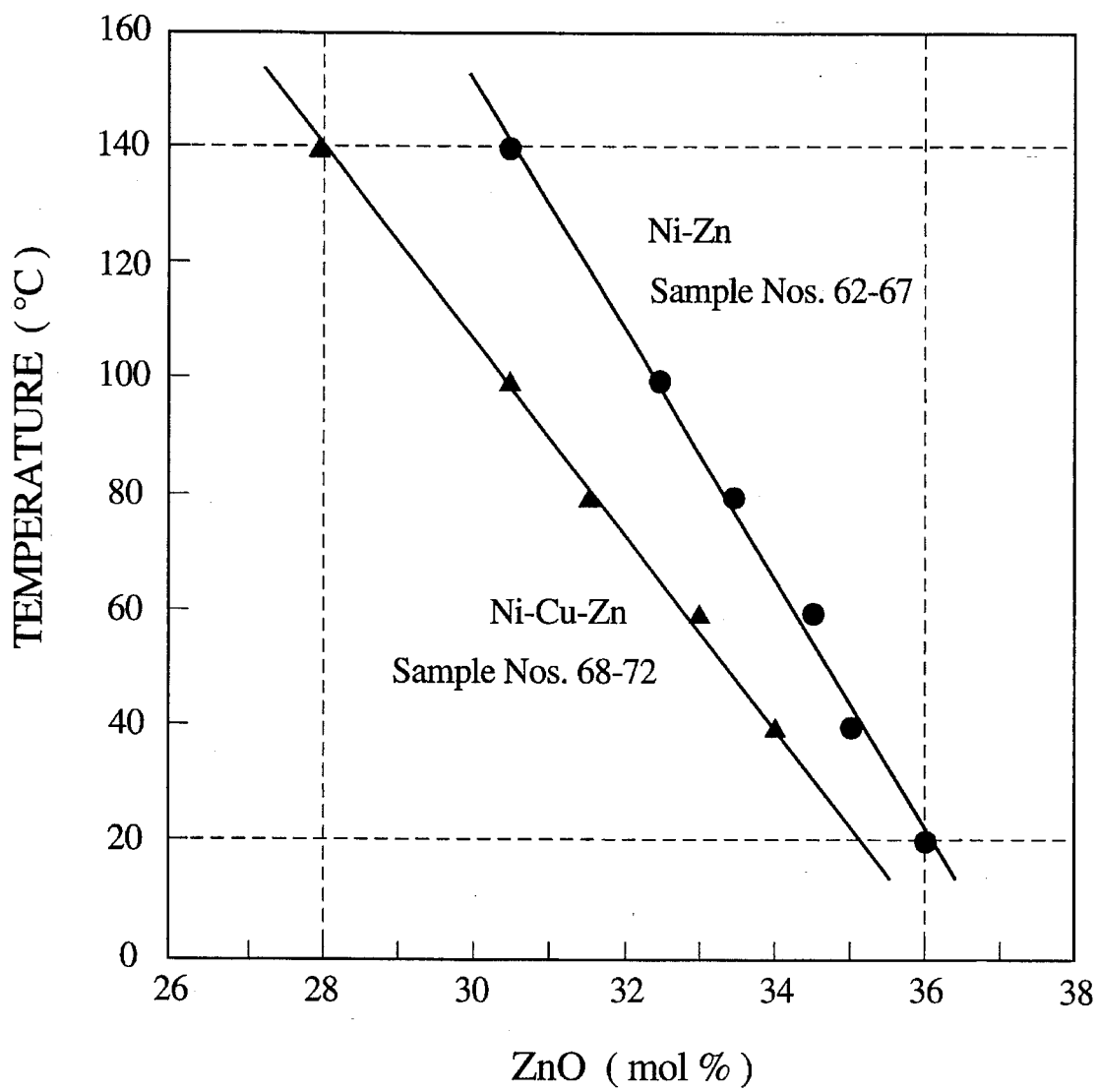
FIG. 3 is a graph showing the relations between the content of ZnO and a temperature at which the minimum core loss can be achieved for the cores of various Ni ferrite sintered bodies according to the present invention.
Figure 4:
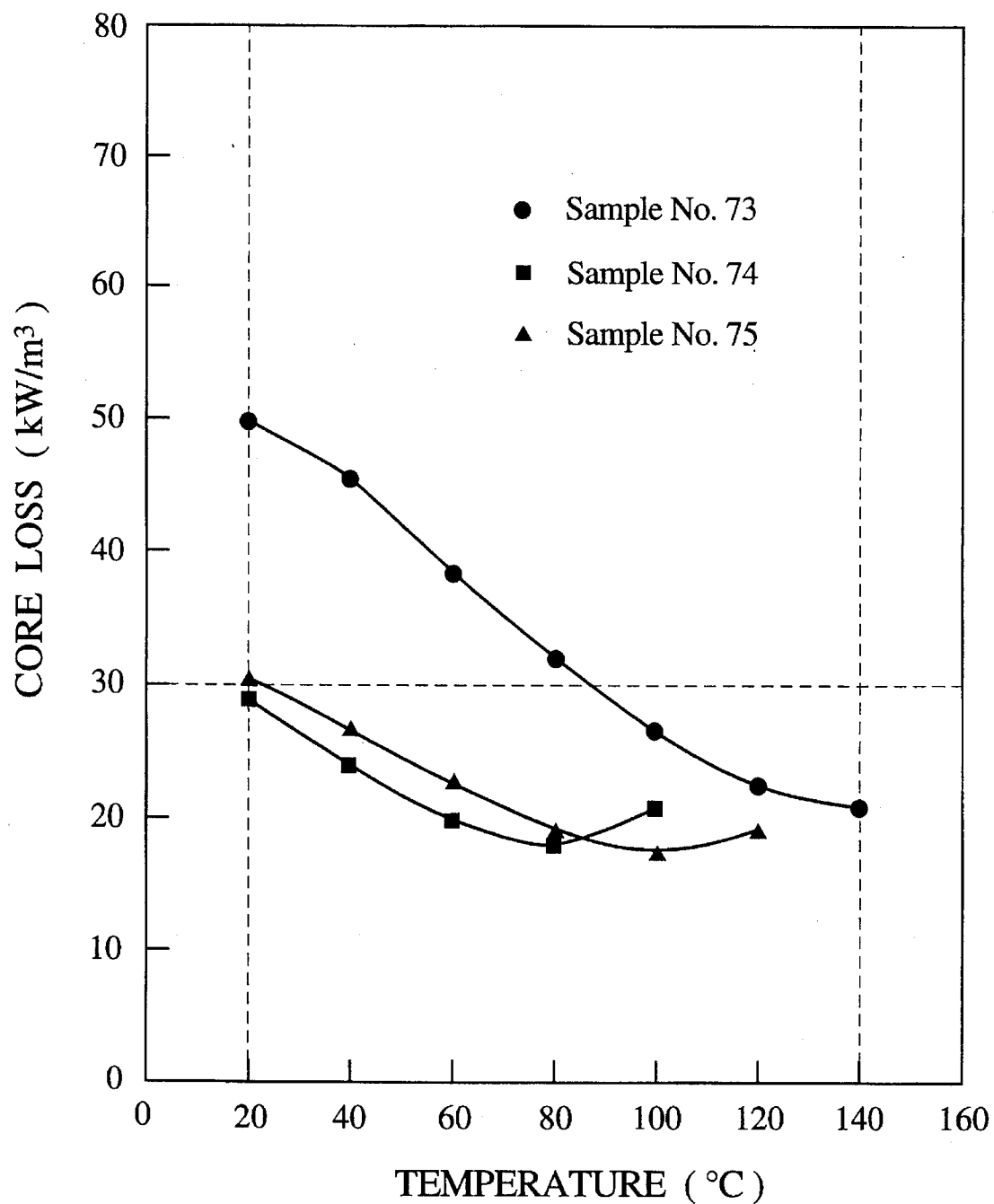
FIG. 4 is a graph showing the core loss variation depending on a temperature for the cores of various Ni ferrite sintered bodies according to the present invention.

Ni ferrite sintered bodies containing various amounts of ZnO were prepared in the same manner as in Example 1 to examine the relations between the content of ZnO and a temperature at which the minimum core loss was obtained. The results are shown in Table 6 and FIG. 3. Though some differences are appreciated between the Ni ferrite sintered bodies containing Cu and those not containing Cu, it has been found that the temperature for obtaining the minimum core loss is almost determined by the amount of ZnO. Thus, with 28.0–36.0 mol % of ZnO, the temperature at Which the minimum core loss is obtained can be controlled within a temperature range of 20°–140° C.

a core loss which was low at a high temperature, and Sample No. 74 was a Ni ferrite sintered body having a core loss which was minimum at about 80° C. and less than 30 kW/m³ at 20°–100° C. Sample No. 75 had a core loss which was minimum at about 100° C. It is clear from Table 7 and FIG. 4 that the Ni ferrite sintered bodies of the present invention show low core loss in a wide temperature range, proving that they are satisfactory for cores of power supplies. Incidentally, it is practically desirable that the Ni ferrite sintered body has a sintering density of 95% or more based on the theoretical density, about 5.1×10³ kg/m³ or more in an absolute value.

TABLE 6

| Sample | Composition (mol %)[1] | | | | Average Crystal Grain Size (μm) | Large Crystal Grain Particles (%)[2] | Core Loss[3] | | Density[4] | Resistivity | Sintering Temp. (°C.) |
|---|---|---|---|---|---|---|---|---|---|---|---|
| | $Fe_2O_3$ | NiO | ZnO | CuO | | | (kW/m³) | (°C.) | (×10³ kg/m³) | (Ω · m) | |
| 62 | 49.5 | 20.0 | 30.5 | 0.0 | 4.1 | 5 | 30 | 140 | 5.23 | 6 × 10⁶ | 1250 |
| 63 | 49.5 | 18.0 | 32.5 | 0.0 | 4.5 | 5 | 25 | 100 | 5.23 | 5 × 10⁶ | 1250 |
| 64 | 49.5 | 17.0 | 33.5 | 0.0 | 4.6 | 4 | 23 | 80 | 5.24 | 6 × 10⁶ | 1250 |
| 65 | 49.5 | 16.0 | 34.5 | 0.0 | 4.8 | 4 | 22 | 60 | 5.23 | 5 × 10⁶ | 1250 |
| 66 | 49.5 | 15.5 | 35.0 | 0.0 | 4.5 | 5 | 25 | 40 | 5.25 | 5 × 10⁶ | 1250 |
| 67 | 49.5 | 14.5 | 36.0 | 0.0 | 5.0 | 3 | 21 | 20 | 5.25 | 4 × 10⁶ | 1250 |
| 68 | 49.5 | 16.5 | 28.0 | 6.0 | 4.4 | 5 | 24 | 140 | 5.26 | 1 × 10⁹ | 1100 |
| 69 | 49.5 | 14.0 | 30.5 | 6.0 | 4.2 | 5 | 27 | 100 | 5.27 | 8 × 10⁸ | 1100 |
| 70 | 49.5 | 13.0 | 31.5 | 6.0 | 4.8 | 2 | 21 | 80 | 5.27 | 9 × 10⁸ | 1100 |
| 71 | 49.5 | 11.5 | 33.0 | 6.0 | 4.7 | 4 | 22 | 60 | 5.28 | 9 × 10⁸ | 1100 |
| 72 | 49.5 | 10.5 | 34.0 | 6.0 | 4.7 | 4 | 23 | 40 | 5.27 | 1 × 10⁹ | 1100 |

Note: [1]–[4]The same as in Table 1.

EXAMPLE 7

Ni ferrite sintered bodies having various compositions were prepared in the same manner as in Example 1 to examine the relations between a core loss at 50 kHz and 50 mT and a temperature. The results are shown in Table 7 and FIG. 4. Sample No. 73 was a Ni ferrite sintered body having

TABLE 7

| Sample | Composition (mol %)[1] | | | | Core Loss-(kW/m³) at 50 kHz and 50 mT | | | | | | |
|---|---|---|---|---|---|---|---|---|---|---|---|
| | $Fe_2O_3$ | NiO | ZnO | CuO | 20° C. | 40° C. | 60° C. | 80° C. | 100° C. | 120° C. | 140° C. |
| 73 | 49.7 | 15.0 | 29.3 | 6.0 | 50.2 | 45.9 | 38.7 | 32.4 | 26.9 | 22.8 | 21.2 |
| 74 | 49.6 | 12.65 | 31.75 | 6.0 | 29.2 | 24.1 | 20.0 | 18.1 | 21.1 | — | — |
| 75 | 49.6 | 13.6 | 30.8 | 6.0 | 31.1 | 27.1 | 23.0 | 19.3 | 17.6 | 19.5 | — |

Note: [1]The same as in Table 1.

As described in detail above, the Ni ferrite sintered body of the present invention shows as low a core loss as 30 kW/m$^3$ or less and has a high resistivity as a nature of Ni ferrite. Accordingly, the Ni ferrite sintered body of the present invention is suitable for transformers of switching power supplies, etc., effective in the miniaturization of transformers and the reduction of production cost thereof.

What is claimed is:

1. A Ni ferrite sintered body comprising 48.0–50.0 mol % of Fe$_2$O$_3$, 14.0–24.0 mol % of NiO, and 28.0–36.0 mol % of ZnO, 12 mol % or less, excluding 0 mol %, of NiO being replaced by the same amount of CuO, said sintered body containing 50 ppm or less of P and having an average crystal grain size of 3–30 μm and a minimum core loss of 30 kW/m$^3$ or less at 50 kHz and 50 mT.

2. The Ni ferrite sintered body according to claim 1, wherein said minimum core loss is achieved in a temperature range of 20°–140° C.

3. The Ni ferrite sintered body according to claim 1, wherein a percentage of crystal grain particles larger than two times the average crystal grain size is 10% or less based on the total number of crystal grain particles in a crystal structure.

* * * * *